FLYWHEEL SYNCHRONIZATION SYSTEM

Filed Nov. 14, 1947

2 SHEETS—SHEET 1

INVENTOR.
Kurt Schlesinger
BY
Foorman L. Mueller
Atty.

Nov. 6, 1951 K. SCHLESINGER 2,574,229

FLYWHEEL SYNCHRONIZATION SYSTEM

Filed Nov. 14, 1947 2 SHEETS—SHEET 2

*INVENTOR.*
Kurt Schlesinger

*BY* Foorman L. Mueller

Atty.

Patented Nov. 6, 1951

2,574,229

UNITED STATES PATENT OFFICE 2,574,229

FLYWHEEL SYNCHRONIZATION SYSTEM

Kurt Schlesinger, Maywood, Ill., assignor to Motorola, Inc., Chicago, Ill., a corporation of Illinois Application November 14, 1947, Serial No. 785,867

18 Claims. (Cl. 250—27)

This invention relates generally to television receivers and more particularly to a synchronization system for providing regularly spaced pulses for controlling the horizontal deflection generator of a television receiver when the horizontal synchronization signals are irregular or fail.

In a television receiver, a sawtooth deflection generator is used for causing the beam of the receiver tube to scan the screen of the tube horizontally to produce the lines of the picture. This generator is held in step by synchronization signals included as a part of the composite video signal. In many instances, however, the synchronization signals become distorted during the transmission and reception thereof and in some cases the signal may fail entirely with the result that synchronization is lost and the picture becomes blurred or distorted, or is torn. In order to overcome these difficulties, systems have been developed wherein the deflection generator is not directly locked with the synchronization pulses but is controlled by the pulses through an automatic frequency control circuit. Although these systems have been generally satisfactory, they have been relatively complicated and expensive, requiring a plurality of tubes. In addition to the expense of the equipment itself, the additional tubes require a larger chassis and a larger power supply further increasing the cost and complexity of the television receiver.

It is, therefore, an object of the present invention to provide a simple and inexpensive system for producing synchronization pulses for controlling a sawtooth deflection generator which are of the same frequency but not positively locked with the synchronization components of the composite video signal.

A further object of this invention is to provide a system for producing sharp pulses for controlling a deflection generator which have the same average frequency as synchronization signals applied thereto but which continue after the applied signals fail.

A still further object of this invention is to provide a shock excited oscillator having an output wave form including sharp peaks thereon, with the oscillator having a minimum of damping so that the waves will continue for a relatively long time.

A feature of this invention is the provision of a shock excited oscillator having a first tank circuit resonant at a given frequency and a second tank circuit resonant at an odd harmonic of said given frequency, and a pickup coil adapted to pick up oscillations of both said frequencies and combine said oscillations in the desired ratio.

A further feature of this invention is the provision of a system for producing regular synchronization pulses from a source of synchronization signals which may be irregular, including an oscillator shock excited by said irregular signals having the tank circuit thereof tuned to provide oscillations of the desired frequency, and means for clipping peaks from said oscillations to produce regularly spaced synchronization pulses.

A still further feature of this invention is the provision of a system including an oscillator which produces waves having sharp peaks thereon and a clipper adapted to clip the peaks from said waves, in which the clipper is automatically biased by the signal level so that output pulses are produced by said clipper when oscillations varying through a wide range of amplitude are applied thereto.

Further objects, features and advantages will be apparent from a consideration of the following description taken in connection with the accompanying drawings in which.

In practicing the invention there is provided a flywheel synchronization system for a television receiver including a shock excited oscillator, the tank circuit of which includes a pair of resonant circuits, one of which is tuned to the line frequency (15,750 cycles per second) and the other is tuned to a low odd harmonic of the line frequency as, for example, the third or fifth harmonic. The oscillator is excited by the line synchronization signals derived from the composite video signal. A pickup coil is provided for combining the signals of the two frequencies to provide a wave having relatively sharp peaks which occur at the frequency of the line synchronization signals. The combined signal is applied to a clipper which cuts off the peaks to provide relatively sharp synchronization pulses. The clipper is biased by the signal so that the clipping level depends upon the signal strength and the circuit, therefore, provides output pulses when the amplitude of the signals applied thereto is relatively low. The system, therefore, while driven by the synchronization pulses, is not positively locked to the individual pulses and will continue operating for a period of time when the synchronization pulses fail.

Figure 1:
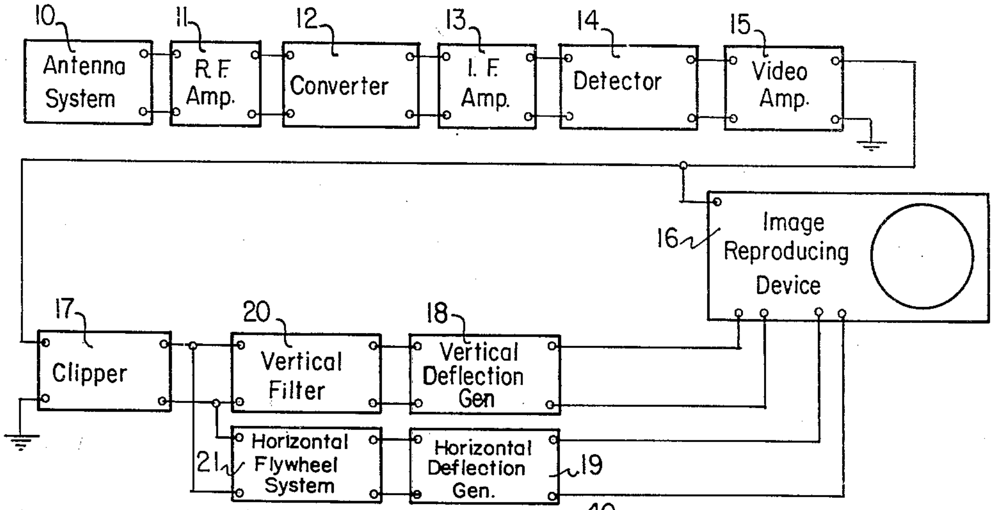
Fig. 1 is a block diagram illustrating a television system in which the invention may be used.

In Fig. 1 there is illustrated a television system in which the invention may be practiced including an antenna system 10 for intercepting modulated video signals. Signals from the antenna system are applied to a radio frequency amplifier 11 wherein signals of the desired frequency are selected and amplified. The amplified radio frequency signals are applied to converter 12 wherein they are reduced in frequency to intermediate frequency signals. The resulting intermediate frequency signals are amplified in intermediate frequency amplifier 13 and the video signal is derived therefrom by detector 14. The video signal is further amplified in video amplifier 15 and applied to image reproducing device 16 and synchronization signal clipper 17. The image reproducing device 16 includes means for producing an electron beam which is modulated by the signals applied thereto from the video amplifier 15. The image reproducing device also includes means for deflecting the electron beam, with the deflecting means being energized by vertical and horizontal deflection generators 18 and 19, respectively. The vertical deflection generator is held in step with synchronization pulses received as a part of the composite video signal which are applied from vertical filter 20 connected to the clipper 17. The horizontal deflection generator is synchronized by the horizontal synchronization pulses and this generator is held in step with line synchronization signals produced by the clipper through the horizontal flywheel system 21 in accordance with the invention. An audio system may be provided for the television receiver in any one of a plurality of standard manners and as the invention does not relate to the audio system, it will not be disclosed in the present application.

Figure 2:
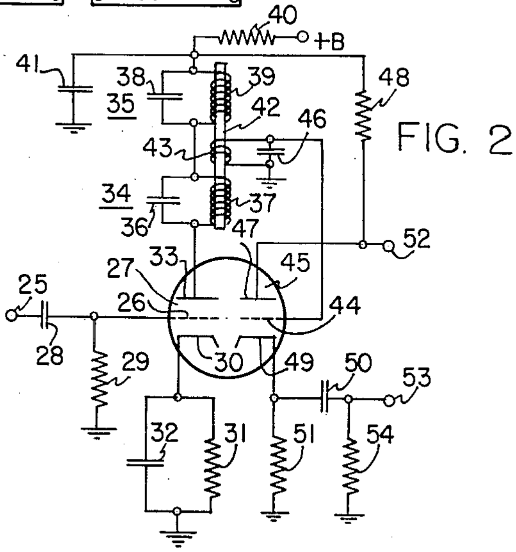
Fig. 2 is a circuit diagram of the flywheel synchronization system in accordance with the invention.

Referring now to Fig. 2, in this figure there is illustrated the circuit diagram of the synchronization system in accordance with the invention which includes a shock excited oscillator and a clipper. The line synchronization signals derived from the composite video signal are applied to the input terminal 25 of the oscillator. Positive synchronization pulses are applied to the grid 26 of a triode valve 27 through a differentiating circuit including condenser 28 and resistor 29. The differentiating circuit has a very short time constant being preferably of the order of 5 microseconds. The valve 27 operates class C and is conducting for the positive peaks produced by the leading edges of the synchronization pulses but is non-conducting for the negative peaks produced by the lagging edges and between pulses. The cathode 30 of the valve 27 is biased by a circuit including resistor 31 and condenser 32 which provide a very long time constant. The time constant of this circuit should be much longer than the interval between line signals so that a plurality of lines are required to build up the bias thereacross. In the plate circuit of the valve 27 there are provided two resonant circuits 34 and 35 which are connected in series. The resonant circuit 34 includes condensers 36 and coil 37, connected in parallel, and resonant circuit 35 includes condenser 38 and coil 39, also connected in parallel. The two resonant circuits are connected between plate 33 of the valve 27 and dropping resistor 40 connected to a source of plus B potential. A by-pass condenser 41 is provided for by-passing radio frequencies. The coils 37 and 39 are preferably wound on iron core 42 on which a third winding 43 is also provided which is arranged to pick up from both coils 37 and 39 and is wound to invert the signal derived therefrom.

Figure 5:
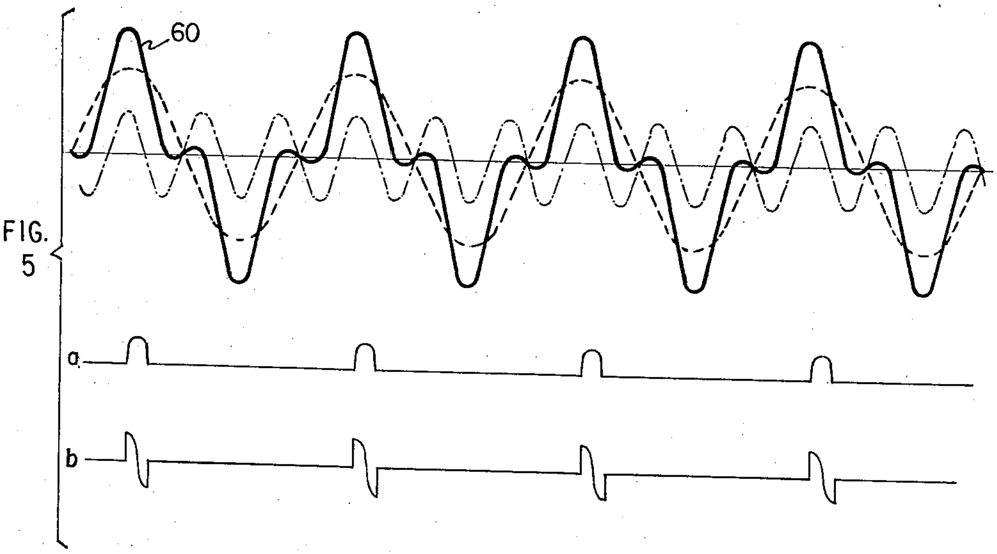
Fig. 5 illustrates one wave form which may be produced by the shock exciter.
Figure 7:
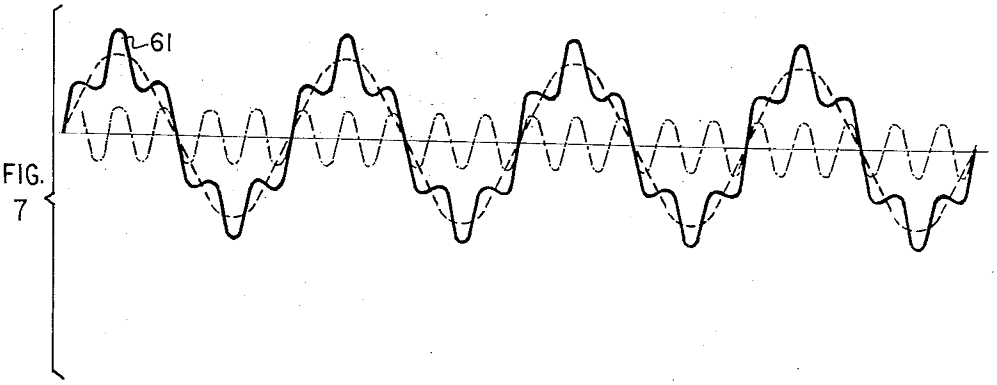
Fig. 7 illustrates a modified wave form which may be used.

In accordance with the invention, the resonant circuit 34 is tuned to the line frequency of the television signal, or 15,750 cycles per second. The resonant circuit 35 is tuned to an odd harmonic of the line frequency, preferably a low harmonic such as the third or fifth. When pulses are applied to the grid 26 of valve 27, plate current flows during the leading edges of the pulses. In Fig. 5 curve *a* shows the synchronization pulse wave and curve *b* shows the differentiated pulse wave produced therefrom. This produces shock excitation of the resonant circuits 34 and 35 causing the circuits to oscillate. These oscillations will continue until they are damped out by the losses in the circuits. As the coil 43 picks up from both coils 37 and 39, the fundamental and harmonic frequencies will be combined in the coil 43 to produce waves as illustrated in Figs. 5 and 7. In Fig. 5 a wave comprising the fundamental and third harmonic with the amplitude of the third harmonic being approximately one-half that of the fundamental is shown. In Fig. 7 the combination of the fundamental and fifth harmonic is shown with the fifth harmonic being substantially one-third the amplitude of the fundamental.

The signal picked up by the coil 43 is applied to the grid 44 of a second triode valve 45 which functions as a self biased cathode follower. As illustrated in Fig. 2 the triodes 27 and 45 may be enclosed in a single envelope. The condenser 46 is placed across the winding 43 to by-pass frequencies higher than the frequency of the resonant circuit 35. The triode 45 includes a plate 47 connected to the plus B power supply through resistors 48 and 40 and a cathode 49 connected to a circuit including condenser 50 and resistor 51 which provide a very short time constant. The proper potential is applied to valve 45 so that it acts as a clipper to provide sharp pulses in both the plate and cathode circuits which are derived from the signal picked up by coil 43. The pulses will appear as negative signals at terminals 52 connected to the plate 47 and as positive pulses at terminal 53 connected across load resistor 54. Either or both of these signals can be used to control the horizontal deflection generator or in any other desired manner.

Figure 6:
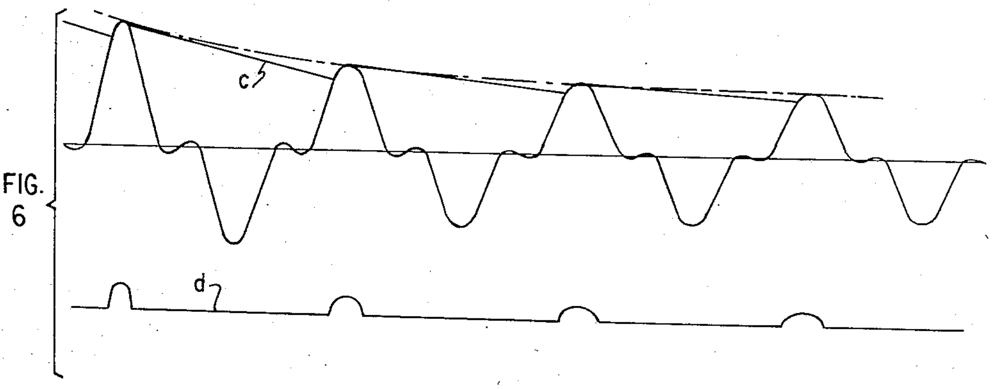
Fig. 6 illustrates the manner in which peaks are clipped from the wave form of Fig. 5.

Referring again to Figs. 5 and 7, it will be apparent that when the resonant circuit 35 is tuned to the third or fifth harmonics of the fundamental line frequency, the wave picked up by coil 43 will have sharp peaks at line frequency. These peaks are indicated at 60 in Fig. 5 and 61 in Fig. 7. Similarly, waves having sharp peaks can be produced by using the line frequency and the seventh and ninth harmonics thereof. The proper voltage is applied to the plate of the clipper 45 to clip the peaks from the waves to produce synchronization pulses therefrom. It is well known that in a system such as disclosed, the resonant circuits 34 and 35 will continue to oscillate or ring for several cycles after the circuits have been excited. The amplitude of the continued oscillations will, however, decrease due to the damping caused by the losses in the circuits. As is well known, the damping increases with frequency and, therefore, the harmonic oscillations will be damped more than the fundamental. In systems as illustrated in Fig. 2, the resonant circuit 34 may be constructed to have a Q of 65 and the circuit will oscillate for about 25 lines. The resonant circuit 35 tuned to the third harmonic, if constructed to have a Q of 80, will produce oscillations for only about 8 lines. In Fig. 6 there is illustrated a wave including the fundamental and third harmonic with the amplitude of the wave dropping exponentially. As the clipper is biased by the signal, and the time constant is very fast, the clipping level will correspond to the signal level and will also decrease exponentially. The clipping level is indicated by curve *c*. Therefore, pulses will be provided through a range of amplitudes of signal level as indicated by curve *d* in Fig. 6 which illustrates the amplitude of the clipped pulses.

Figure 3:
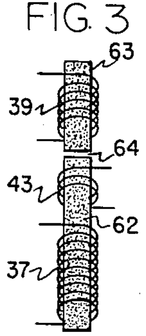
Figs. 3 and 4 are details of the mixing unit used in the system of Fig. 2.
Figure 4:
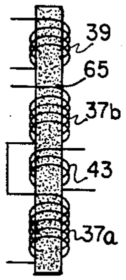

In order to provide the proper combination of fundamental and harmonic to produce a wave form having sharp peaks, coil arrangements as illustrated in Figs. 3 and 4 may be used. In Fig. 3 the coil 37 of the resonant circuit 34 and the pickup coil 43 are wound on a single core 62 and the coil 39 is wound on a core 63. An air gap 64 is provided between the cores 62 and 63 and can be varied to control the relative amplitude of the fundamental and harmonic picked up by the coil 43. When using the third harmonic as illustrated in Figs. 5 and 6, it has been found to be desirable to make the amplitude of the fifth harmonic approximately one-half that of the fundamental oscillation. When using the fifth harmonic as illustrated in Fig. 7, it has been found that the amplitude of the harmonic should be from one-third to one-half that of the fundamental. This ratio can be varied by moving the coil 43 on the core 62 or by changing the air gap 64 as previously explained. An alternative arrangement for controlling the signal picked up by the coil 43 is shown in Fig. 4 in which the coil 37 is divided so that the pickup coil can be placed between the two sections 37*a* and 37*b* thereof. This provides very close coupling between coils 37 and 43 and relatively loose coupling between coils 39 and 43 so that pick-up of the fundamental is greater than that of the harmonic. As previously stated, the pickup coil 43 is reversed with respect to the coils 37 and 39. The reason for this is apparent as it is known that a shock excited oscillator produces a maximum negative peak when excited by a driving pulse. As it is desired to clip the positive peaks, it is necessary to reverse the phase of the oscillations so that the coil 43 provides a wave having positive peaks which coincide with the synchronization signals applied to the shock exciter.

It is, therefore, seen that a system is provided which produces synchronization pulses which are regularly spaced from a synchronization signal which may be erratic and distorted. The system is an enforced system and, accordingly, the average frequency of the output pulses will be equal to the average frequency of the synchronization signals applied thereto. The pulses, however, are not positively locked with the synchronization signals so that any irregularity of the synchronization signals can be eliminated. By making the resonant circuits 34 and 35 of very high Q, the damping therein is low so that the oscillations will be sustained for a relatively long time. It is well known that such damping is greater at high frequencies so that by using low harmonics, as the third and fifth, the oscillations can be sustained for a maximum period.

Systems using the circuits in accordance with the invention have been successfully tested, and systems using the fundamental and third harmonic as well as systems using the fundamental and fifth harmonic have proven satisfactory. Systems using third harmonic have the advantage that the damping is less and the system will continue to oscillate for a longer period of time if synchronization pulses will fail. Also, the amplitude available for clipping is large as compared to waves using the fifth harmonic. Systems using the fifth harmonic obviously have the advantage that a slightly sharper peak is provided resulting in a sharper output pulse. The output pulses from systems using the third harmonic have been sufficiently sharp, however, to provide accurate triggering of a standard deflection generator.

While I have described certain embodiments of my invention which are illustrative thereof, it is pointed out that various changes and modifications can be made therein without departing from the intended scope of the invention as defined in the appended claims.

I claim:

1. A synchronization system adapted to receive a first pulse wave and produce a second pulse wave having the same average frequency and in which irregularities in the occurrence of said pulses in said first wave do not produce similar irregularities in said pulses in said second wave comprising, means excited by said first pulse wave for producing a complex output wave including a sine wave of the frequency of said first pulse wave having an odd harmonic superimposed thereon so that said complex wave has sharp peaks occurring at the average frequency of said first pulse wave, said means being effective to produce said complex wave at reduced amplitude in the event said first pulse wave fails, means for clipping said sharp peaks from said complex wave, and means for biasing said clipping means so that pulses are produced when the amplitude of said signal is reduced.

2. In a synchronization system adapted to receive a first pulse wave and produce a second pulse wave having the same average frequency therefrom, means excited by said first pulse wave for producing a complex output wave including a sine wave of said average frequency with an odd harmonic thereof forming sharp peaks thereon, said means being effective to continue to produce said complex wave at reduced amplitude in the event said first pulse wave fails, and means for clipping the sharp peaks from said complex wave, said clipping means being biased in accordance with the amplitude of said complex wave so that pulses are produced when the amplitude of said signal is reduced.

3. In a synchronization system adapted to receive a first pulse wave and produce a second pulse wave having the same average frequency therefrom, means for differentiating said first pulse wave to provide a wave of sharp pulses, means excited by said differentiated pulse wave for producing an output wave having sharp peaks occurring at the average frequency of the pulses of said first wave, said means being effective to produce said output wave at reduced amplitude in the event said first pulse wave fails, means for clipping the sharp peaks from said output wave to produce said second pulse wave, said clipping means being biased in accordance with the amplitude of said output wave so that pulses are still produced when the amplitude of said signal is reduced.

4. A flywheel synchronization system adapted to receive a first pulse wave and produce a second pulse wave of the same average frequency therefrom comprising, a shock excited oscillator driven by said first pulse wave for producing a complex output wave including a sine wave of said average frequency with an odd harmonic superimposed thereon forming sharp peaks on said wave at said average frequency, said oscillator being effective to continue to produce said complex wave at reduced amplitude in the event said first pulse wave fails, and means for clipping the sharp peaks occurring at the frequency of said first wave from said complex wave, said clipping means being biased in accordance with the amplitude of said complex wave so that pulses are produced when the amplitude of said signal is reduced.

5. A flywheel synchronization system adapted to receive a first irregular pulse wave and produce a second regular pulse wave of the same average frequency therefrom comprising, a shock excited oscillator driven by said first pulse wave for producing an output wave having sharp peaks occurring at said average frequency, said oscillator being effective to produce said output wave at reduced amplitude in the event said first pulse wave fails, and means for clipping the sharp peaks from said output wave to produce said second pulse wave, said clipping means being biased in accordance with the amplitude of said output wave so that pulses are still produced when the amplitude of said signal is reduced.

6. A synchronization system adapted to be excited by a first irregular pulse wave for producing a second wave of regularly spaced pulses which occur at the same average frequency as said first pulse wave comprising, a shock excited oscillator driven by said first pulse wave and including a first circuit resonant at said average frequency, a second circuit resonant at an odd harmonic of said average frequency, and, means for combining the oscillations produced in said first and second resonant circuits to produce a complex wave having sharp peaks occurring at said average frequency, and means for clipping said sharp peaks from said complex wave to produce said second wave.

7. A system as recited in claim 6 in which said second circuit is resonant at the third harmonic of said first pulse wave.

8. A system as recited in claim 6 in which said second circuit is resonant at the fifth harmonic of said first pulse wave.

9. A system as recited in claim 6 in which said second circuit is resonant at the third harmonic of said first pulse wave and said oscillations are combined in such manner that the amplitude of said third harmonic component of said wave is of the order of one-half of the amplitude of the fundamental frequency thereof.

10. A system as recited in claim 6 in which said second circuit is resonant at the fifth harmonic of said first pulse wave and said oscillations are combined in such manner that the amplitude of said fifth harmonic component of said wave is in the range from one-third to one-half of the amplitude of the fundamental frequency thereof.

11. A flywheel synchronization system adapted to be excited by a first irregular pulse wave and produce a second wave of regularly spaced pulses which occur at the same average frequency as said first pulse wave comprising, a shock excited oscillator driven by said first pulse wave and including a first circuit resonant at said average frequency and a second circuit resonant at an odd harmonic thereof, means combining the oscillations produced in said first and second resonant circuits to produce a complex wave having sharp peaks occurring at said average frequency, said oscillator producing said complex wave at reduced amplitude when said first pulse wave fails, and means for clipping said sharp peaks from said complex wave, said clipping means being biased in accordance with the amplitude of said complex wave so that the clipping level is reduced as said amplitude is reduced.

12. A synchronization system adapted to be excited by a first irregular pulse wave and produce a second wave of regularly spaced pulses which occur at the same frequency as said first pulse wave comprising, a shock excited oscillator driven by said first pulse wave and including a first circuit resonant at the frequency of said first pulse wave and a second circuit resonant at an odd harmonic thereof, each of said circuits including a coil, a pickup coil inductively coupled to said coils of said first and second circuits for combining the oscillations produced in said first and second resonant circuits to produce a complex wave having sharp positive peaks occurring at the frequency of said first wave, said oscillator being adapted to produce said complex wave at reduced amplitude when said first pulse wave fails, and means for clipping said sharp peaks from said complex wave, said clipping means being biased in accordance with the amplitude of said complex wave so that the clipping level is reduced as said amplitude is reduced.

13. Apparatus for producing an output wave having regularly spaced sharp peaks occurring at the same average frequency as a wave of synchronization pulses which may be irregularly spaced comprising, a differentiating circuit for producing sharp pulses from said synchronization pulses, a shock excited oscillator driven by said sharp pulses, said oscillator having a tank circuit including a first circuit resonant at said average frequency and a second circuit resonant at an odd harmonic thereof, and means combining the oscillations produced in said first and second resonant circuits.

14. In a television receiver including means for providing synchronization pulses of line frequency which may be irregularly spaced from the composite video signal, means for producing a wave of regularly spaced pulses of line frequency comprising, a shock excited oscillator driven by said synchronization pulses for producing an output wave having sharp peaks occurring at said line frequency, said oscillator being effective to produce said output wave at reduced amplitude in the event said synchronization pulses fail, means for clipping said sharp peaks from said output wave to produce said wave of regularly spaced pulses, said clipping means being biased in accordance with the amplitude of said output wave so that pulses are produced when the amplitude of said wave is reduced.

15. Apparatus for producing an output wave having sharp peaks occurring at the same frequency as a wave of synchronization pulses comprising, a shock excited oscillator driven by said synchronization pulses, said oscillator having a tank circuit including a first circuit resonant at the frequency of said first pulse wave and a second circuit resonant at an odd harmonic thereof, each of said resonant circuits including a condenser and a coil, a pickup coil inductively associated with said coils of said resonant circuits for combining the oscillations produced therein and for inverting the combined wave, a first core for said coil of said first resonant circuit and said pickup coil and a second core for said coil of said second resonant circuit, said cores being positioned to provide an air gap therebetween so that the oscillations from said first resonant circuit induced in said pickup coil are of greater amplitude than the oscillations from said second resonant circuit.

16. Apparatus for producing an output wave having sharp peaks occurring at the same frequency as a wave of synchronization pulses comprising, a shock excited oscillator driven by said synchronization pulses, said oscillator having a tank circuit including a first circuit resonant at the frequency of said first pulse wave and a second circuit resonant at an odd harmonic thereof, each of said resonant circuits including a condenser and a coil, a pickup coil inductively associated with said coils of said resonant circuits for combining the oscillations produced therein and for inverting the combined wave, said coil of said first resonant circuit including two portions and said pickup coil being positioned between said two portions so that the oscillations from said first resonant circuit induced in said pickup coil are relatively large and the oscillations from said second resonant circuit induced in said pickup coil are relatively small.

17. In a synchronization system, the method of producing a wave of regularly spaced pulses having the same average frequency as an original wave of pulses which are irregularly spaced comprising the steps of, differentiating said original pulse wave to produce a wave of sharp pulses, deriving a regular sine wave of said average frequency from said wave of sharp pulses, deriving a regular sine wave having a frequency which is an odd harmonic of said average frequency from said wave of sharp pulses, combining said sine waves to provide an output wave having sharp peaks, clipping said sharp peaks from said output wave, and controlling the clipping level in accordance with the amplitude of said output wave.

18. The method of producing a wave of regularly spaced pulses having the same average frequency as an original wave of pulses which are irregularly spaced comprising the steps of, deriving a regular sine wave of said average frequency from said original wave of pulses, deriving a regular sine wave having a frequency which is an odd harmonic of said average frequency from said original wave of pulses, combining said sine waves to provide an output wave having sharp peaks, clipping said sharp peaks from said output wave to provide a regularly spaced pulse wave, and controlling the clipping level in accordance with the amplitude of said output wave.

KURT SCHLESINGER.

REFERENCES CITED

The following references are of record in the file of this patent:

UNITED STATES PATENTS

| Number | Name | Date |
|---|---|---|
| 2,105,870 | Vance | Jan. 18, 1938 |
| 2,141,231 | Trautwen | Dec. 27, 1938 |
| 2,416,424 | Wilson | Feb. 25, 1947 |